United States Patent
Baur et al.

(10) Patent No.: US 8,086,476 B2
(45) Date of Patent: Dec. 27, 2011

(54) METHOD FOR DIRECTED ADVERTISING AND INFORMATION DISTRIBUTION USING A WIRELESS COMMUNICATIONS NETWORK

(76) Inventors: Peter G. Baur, Memphis, TN (US); Andrew P. Baur, Memphis, TN (US)

( * ) Notice: Subject to any disclaimer, the term of this patent is extended or adjusted under 35 U.S.C. 154(b) by 1650 days.

(21) Appl. No.: 11/207,846

(22) Filed: Aug. 19, 2005

(65) Prior Publication Data

US 2007/0055565 A1    Mar. 8, 2007

Related U.S. Application Data

(60) Provisional application No. 60/704,947, filed on Aug. 3, 2005.

(51) Int. Cl.
*G06Q 10/00* (2006.01)
*G06F 17/60* (2006.01)

(52) U.S. Cl. ............................................. 705/5; 705/14
(58) Field of Classification Search ................ 705/5
See application file for complete search history.

(56) References Cited

U.S. PATENT DOCUMENTS

| | | | |
|---|---|---|---|
| 5,937,037 A * | 8/1999 | Kamel et al. ............. | 379/88.19 |
| 6,101,381 A * | 8/2000 | Tajima et al. ............ | 455/414.2 |
| 6,182,050 B1 | 1/2001 | Ballard | |
| 6,240,295 B1 | 5/2001 | Kennedy, III et al. | |
| 6,385,592 B1 | 5/2002 | Angles et al. | |
| 6,484,148 B1 * | 11/2002 | Boyd ............................. | 705/14 |
| 6,509,833 B2 | 1/2003 | Tate | |
| 6,856,673 B1 | 2/2005 | Banks et al. | |
| 2003/0032409 A1 * | 2/2003 | Hutcheson et al. ........... | 455/414 |
| 2004/0113936 A1 * | 6/2004 | Dempski ....................... | 345/738 |
| 2004/0186780 A1 * | 9/2004 | Short et al. .................... | 705/14 |

OTHER PUBLICATIONS

JP 2003087440 Published: Mar. 20, 2003 to Umezawa et al.*

* cited by examiner

*Primary Examiner* — Garcia Ade
(74) *Attorney, Agent, or Firm* — Stradley Ronon Stevens & Young LLP

(57) ABSTRACT

A method of and system for directing targeted advertising or transmitting information to end users, using wireless or mobile media, including cellular media, is disclosed. In one embodiment, the method and system interconnects (a) advertisers or sponsors, (b) wireless device users ("system users"), and (c) wireless telecommunications companies ("telecoms"), via (d) an intermediary or "hub entity." The hub entity maintains and controls computer operated software and data bases to direct specific advertising or information to targeted system users; collects subscription fees and distributes advertising fees; and determines the effectiveness of various advertising or information transmitted to specific system users. The method can further be customized for application as an information provider, alert notice or security warning system. In other embodiments the method and system may be applied to work with the membership of an organization, such as credit card companies' cardholders, an insurance companies' policy holders, employees, tenants, or other local, national, or world-wide groups or organizations.

27 Claims, 9 Drawing Sheets

METHOD FOR DIRECTED ADVERTISING AND INFORMATION DISTRIBUTION USING A WIRELESS COMMUNICATIONS NETWORK

CROSS REFERENCE TO RELATED APPLICATIONS

This application claims the benefit of priority to U.S. Provisional Patent Application No. 60/704,947, filed on Aug. 3, 2005, the contents of which are incorporated in this application by reference.

TECHNICAL FIELD

The present invention relates to a method and system for directing advertising and information to identified target recipients. More particularly, this invention relates to a method of targeting advertising to selected consumers through a wireless communications network, such as a cellular telephone network, whereby advertisers subscribe to have their advertisements transmitted to a target audience via wireless and mobile communications devices, and the mobile communication device users subscribe and agree to receive a prescribed number of advertisements during a set time period in return for receiving a fee for each advertisement transmitted to the mobile communications device users. In related aspects of the inventive advertising method, the method can be used to improve the effectiveness of advertising and marketing by tracking the transmitted advertisements that result in a wireless/mobile communications device user making a purchase or using an advertiser's service. Other aspects of the inventive directed advertising method permit, as part of the subscription process, third party funding to an organization selected by the wireless/mobile communication device users. In other embodiments of the inventive method, not related to advertising or marketing, the targeted information being transmitted over a communications network can be general notices, general or personal reminders, and/or alerts and warnings.

BACKGROUND OF THE INVENTION

Wireless and, more specifically, mobile communications, are becoming more prevalent in all aspects of everyone's daily lives. A primary example of wireless or mobile communications are the expanding cellular networks that are used by cell phones and other wireless paging and email communications devices. Such devices use SMS ("short message service"), MMS ("multimedia messaging service"), SMIL ("synchronized multimedia integration language") as well as other developing technologies, services and languages to send and receive text, images, audio, video and other media.

Business dealings and personal events are each day affected by the expanding capabilities of wireless, mobile communications. Cell phones, for example, are used today to transmit and receive various types of information and data that simply could not be accomplished several years ago. In particular, while ten years ago, it was largely unheard of that one could obtain a good Internet connection through a cell phone, today, such web based connections are not uncommon. Indeed, movies, commercials, and videos are easily streamed to an end-user's cell phone using SMIL and MMS technologies. Moreover, text messaging and other media transmission and reception via wireless communications devices are becoming the means of communication no matter where the sender or recipient of the communication are located.

In view of the fact that wireless communication devices and wireless communication signals are becoming more robust and are consistently having a much wider, and useable, signal geographic footprint, and because such devices, including cell phones, pagers, and Blackberry™ type devices, tend to be easily carried by a growing number of users, such wireless communications devices are an attractive means of providing information to recipients no matter where the user is located, or whether he or she is connected to a land-line, or to a computer terminal and the Internet.

The use of the expanding capabilities of wireless and mobile communications, including cellular media, provides a new and exciting platform for directed and focused marketing and advertising. Such wireless and mobile communications technology may also be useful for information distribution, general reminders and/or specific alert notifications directed to individuals or to a previously selected, and defined group of mobile communications device users.

Within the advertising and marketing world, the commercializing and marketing of one's products and services is becoming more difficult. Consumers are intelligent and discriminating, especially when it comes to advertising and marketing materials. Advertising campaigns or marketing projects that indiscriminately reach both targeted as well as not targeted consumers/individuals are an inefficient use of a company's marketing budget.

In order to improve the use of one's marketing dollars, a marketing program should ideally be targeted to the audience most likely to respond positively to the advertising message. Moreover and ideally the program should be able to be readily modified based upon results obtained from the marketing effort. The question that should always be posed regarding a marketing or advertising program is whether the advertising and marketing is actually bringing in the identified consumers/customers? That is, is the program effective, either as intended and planned, or in some other way. If the program is not effective, i.e., it is not working, then the program should be modified, revised or simply stopped.

While the use of wireless and mobile communications devices, e.g., cell phones, satellite phones, pagers, and Blackberry™ type devices, to transmit and receive information is expanding, the use of such wireless and mobile communications technology to target advertising and/or to direct information, while providing a means for the mobile communications device users to offset a portion of their communication device service bills, has not been seriously explored. Moreover, the use of such technologies to provide targeted and personalized advertising based upon information from subscribing end users, who provide general demographic information and specific interest information, has not been effectively achieved.

Methods and systems relating to directed advertising or providing warning alert information have been developed. None however has achieved any recognizable level of acceptance or utility. For example, U.S. Pat. No. 6,128,050, issued to Ballard, teaches methods and systems for matching advertisements and target consumers by using filter programs installed on the consumers/end users' computers. The methods and systems disclosed by Ballard do not lend themselves to use with a wireless, mobile communications or cellular network, or cell phones, in part because the filter programs are specific to each end user and are installed on each end users' computer. Such methods and systems are inherently limited by the capability of the end user device, including the particular separate programming needed at the end user device.

Similarly, U.S. Pat. No. 6,385,592, issued to Angles et al., describes a system and method for delivering customized electronic advertisements in an interactive communication system. The Angles et al. system interconnects in an on-line fashion, the computers of an advertisement provider, a content provider, and a consumer. Upon the request of a consumer for current offerings, the advertisement provider computer generates a custom advertisement based upon the consumer's profile. Although the Angles et al. system and method teach a means of creating a customized advertisement for each specific consumer, the system is limited to initiation or a request by the consumer, and does not appear to be applicable to wireless and mobile communication devices.

U.S. Pat. No. 6,856,673, issued to Banks et al., discloses a system and method for providing targeted advertising to telephone callers in mid-dial. According to the Banks et al. invention, upon entry of a partial telephone number, the system and method determines, based upon whether appropriate conditions are met, whether an advertisement should be presented to the caller prior to completing the dialing process. The Banks et al. system and method selects advertisements to transmit to the telephone user based upon the user's entry of a partial telephone number and prior to the completion of the user's dialing. Although the Banks et al. system and method disclose use of an advertising profile database and caller profile database to determine whether to interrupt the caller's dialing, the system and method do not teach any means of transmitting particular advertising to the telephone caller without the caller first initiating a telephone call.

Within the context of warning alert notifications, U.S. Pat. No. 6,509,833, issued to Tate, provides a disclosure for a method and system providing a warning alert to subscribers of a telecommunications system. In a primary aspect, the Tate invention is a telecommunications based warning distribution system comprising a central switch having an internal controller, a subscriber data base, and a remote switch. The central and remote switches are each coupled to a different plurality of subscribers' communications devices. Upon the notification by an emergency warning provider, a warning alert is generated for and transmitted to all subscribers within the subscriber data base where certain characteristics of the subscribers are satisfied. Such characteristics include the global positioning system determined geographic locations of the communications devices. Neither the method nor system disclosed in Tate describe a separate organizing entity that is capable of matching particular information from an information provider with an end-user's request for that particular information. The Tate method and system in a relative indiscriminant fashion sends warning alerts to all end-users within the communications reach of the central switch.

Accordingly, there does not appear to be any known prior art methods, systems, or patents, that disclose or address the potential advantages of using wireless or mobile communications technology, such as cellular technology, to direct advertising or information from subscribing advertisers or information providers, to subscribing mobile communications device users in return for the subscribing end-users receiving a fee for each advertisement or notice received by the subscribing wireless communications end user. Moreover, there does not appear to be a method or system whereby the subscribing wireless communications end user provides general demographic information and/or specific interest information to an entity to allow for targeting of marketing advertisements, and targeting of desired information.

Such a method and system would be highly desirable for advertisers (to improve the effectiveness and efficiency of advertising budgets), for information providers (to quickly provide information, notices or warnings to a target audience requesting such information), and to mobile communication device users (to provide an economic reimbursement and offset for the mobile device usage, while also providing information having a high potential of relevancy and interest to the mobile device user). Such an innovative method and system has not been seen or achieved in the relevant art. The following describes such a method and system.

SUMMARY OF THE INVENTION

The above noted problems, which are inadequately or incompletely resolved by the prior art are completely addressed and resolved by the present invention.

A preferred embodiment of the invention is a method for conducting targeted advertising using a wireless communications network, the method having a central organizing entity, subscribing advertisers, subscribing consumers, and a communications service provider, the method comprising the steps of receiving from the subscribing advertisers, advertising information to be transmitted to a targeted set of the subscribing consumers; receiving from the subscribing advertisers, information describing an intended set of recipient consumers; collecting from the subscribing advertisers, a fee for transmitting the advertising information to the targeted set of subscribing consumers; receiving from each of the subscribing consumers, first information describing each subscribing consumers' wireless communications identification information; receiving from each of the subscribing consumers, second information describing each subscribing consumers' preferences for receiving advertising information; selecting specific subscribing advertisers' advertising information to be transmitted, over a wireless communications network, to a first subset of the subscribing consumers who have identified a desire to receive the specific subscribing advertisers' advertising information; transmitting the selected specific subscribing advertisers' advertising information to the subset of subscribing consumers who have identified a desire to receive the specific subscribing advertisers' advertising information; and distributing to the subset of subscribing consumers who have received the specific subscribing advertisers' information, a fee for each specific advertising information transmitted to the subset of subscribing consumers.

Another preferred embodiment of the invention is a method for conducting targeted advertising using a wireless communications network, the method having a central organizing entity, subscribing advertisers, subscribing consumers, and a communications service provider, the method comprising the steps of receiving from the subscribing advertisers, advertising information to be transmitted to a targeted set of the subscribing consumers; receiving from the subscribing advertisers, information describing an intended set of recipient consumers; collecting from the subscribing advertisers, a fee for transmitting the advertising information to the targeted set of subscribing consumers; receiving from each of the subscribing consumers, first information describing each subscribing consumers' wireless communications identification information; receiving from each of the subscribing consumers, second information describing each subscribing consumers' preferences for receiving advertising information; selecting specific subscribing advertisers' advertising information to be transmitted, over a wireless communications network, to a first subset of the subscribing consumers who have identified a desire to receive the specific subscribing advertisers' advertising information; transmitting a preselected number of the selected specific subscribing advertisers' advertising information during a preselected time period to the subset of subscribing consumers who have identified a desire to receive the specific subscribing advertisers' advertising information; and distributing to the subset of subscribing consumers who have received the specific subscribing advertisers' information, a fee for each specific advertising information transmitted to the subset of subscribing consumers.

Still another preferred embodiment of the present invention is a method for transmitting information using a wireless communications network, the method having a central organizing entity, subscribing information providers, subscribing recipients, and a communications service provider, the method comprising the steps of receiving from the subscribing information providers, information to be transmitted to a targeted set of the subscribing recipients; receiving from the subscribing information providers, information describing an intended set of recipients; collecting from the subscribing information providers, a fee for transmitting the advertising information to the targeted set of subscribing recipients; receiving from each of the subscribing recipients, first information describing each subscribing recipient's wireless communications identification information; receiving from each of the subscribing recipients, second information describing each subscribing recipient's preferences for receiving information; selecting specific subscribing information providers' information to be transmitted, over a wireless communications network, to a first subset of the subscribing recipients who have identified a desire to receive the specific subscribing information provider's information; transmitting the selected specific subscribing information provider's information to the subset of subscribing recipients who have identified a desire to receive the specific subscribing information provider's information; and distributing to the subset of subscribing recipients who have received the specific subscribing information provider's information, a fee for each specific information transmitted to the subset of subscribing recipients.

In still another embodiment of the present invention is a system for conducting targeted advertising using a wireless communications network, comprising a central organizing entity to coordinate collection and transmission of advertising information, said central organizing entity also coordinating collection and distribution of fees for the targeted advertising service; a plurality of subscribing advertisers providing advertisements to the central organizing entity to be transmitted to targeted consumers using a wireless communications network, said subscribing advertisers paying a fee to the central organizing entity for the central organizing entity's service of transmitting the advertisements to the targeted consumers; and a plurality of subscribing consumers agreeing to receive, using a wireless communications network, a limited number of the advertisers' advertisements that are selected by said consumers, from the central organizing entity during a preselected time period in exchange for receiving a fee for each advertisement transmitted to the subscribing consumers over the wireless communications network.

A further embodiment of the present invention is a system for directing information over a wireless communications network to various wireless communications devices used by a selected group of wireless communications device users, comprising a central organizing entity to coordinate collection and transmission of information to be directed to a selected group of wireless communications device users, said central organizing entity also coordinating collection and distribution of fees for the service of directing the information; an information provider supplying the information to the central organizing entity to be transmitted to the selected group of wireless communications device users, using a wireless communications network, said information provider paying a fee to the central organizing entity for the central organizing entity's service of transmitting the information to the selected group of wireless communications device users; and a selected group of wireless communications device users subscribing with the central organizing entity to receive the information provided by the information provider and transmitted by the central organizing entity to the wireless communications devices of the selected group of wireless communications device users.

A specific further embodiment of the present invention is a method or system for conducting targeted advertising, or for directing information, that uses a wireless communications network, where the wireless communications network is a cellular media network.

The invention will be best understood by reading the following detailed description of the several disclosed embodiments in conjunction with the attached drawings that briefly described below.

BRIEF DESCRIPTION OF THE DRAWING

For the purpose of illustrating the invention, the attached drawings show several embodiments and aspects of several embodiments that are presently preferred. However, it should be understood that the invention is not limited to the precise arrangement, system flow, and instrumentality shown in the accompanying drawings.

DETAILED DESCRIPTION OF THE INVENTION

The inventive method taught is a process for directing or targeting the transmission of advertisements or other information over a wireless communications network to identified subscribing wireless communications end users. Several important aspects of the inventive method are (1) the economic incentive to encourage the end users to subscribe, (2) the ability of the end users to identify their preferences for information received; and (3) the capability to update and improve the process of targeting particular end users by using various types of feedback received from the advertisers.

The method of directed or targeted advertisement and information transmission is also disclosed as a system comprised of four elements: (1) a hub entity, or central organizing entity, that takes in and distributes information through the use of wireless or mobile communications technology from different elements of an advertising or information providing system; (2) the advertisers or information providers; (3) the wireless communications system end users; and (4) the wireless communications system owners or providers. The hub entity is the center of operations for the system and (a) controls and directs the distribution of the advertisements and information transmissions to the identified wireless communications end users, (b) collects private and proprietary subscriber information, including general subscriber information, and maintains the secrecy of all such subscriber information, (c) monitors the effect of the advertising or information transmissions through feedback provided by the advertisers or information providers, and (d) manages and distributes the economic incentives to the various subscribing members who are part of the system.

While the following detailed description is presented for a general wireless communications network or system, such a system would include a mobile communications network, or more specifically, could be a cellular communications system, including cell phones or Blackberry™ type wireless devices, or a satellite communications system. Each of these wireless networks, and others, are intended to be covered by the inventive method, because the disclosed method and system has direct application to any wireless, mobile, cellular, and/or satellite communications network.

The Basic Directed Advertising/Information Providing Method

Figure 1:
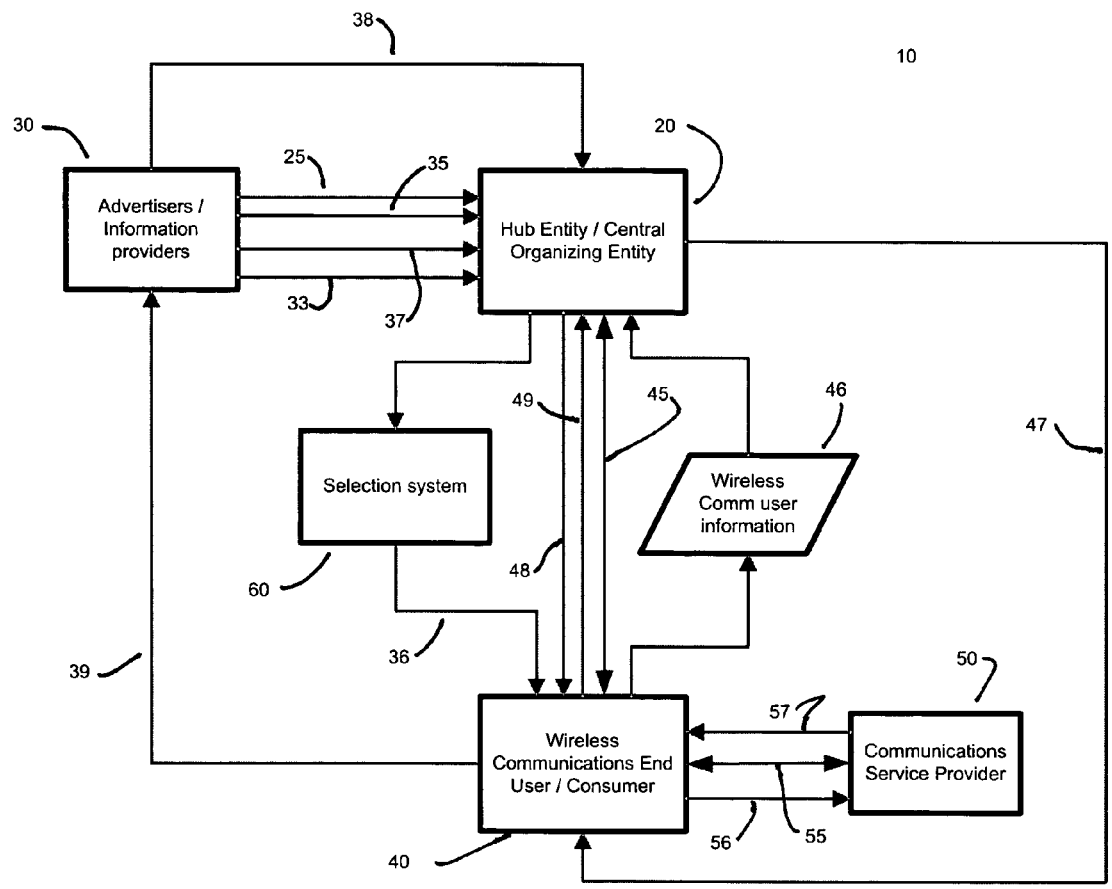
FIG. 1: is a flowchart of an embodiment of the inventive business method for directing advertising to wireless communication device users.
Figure 2:
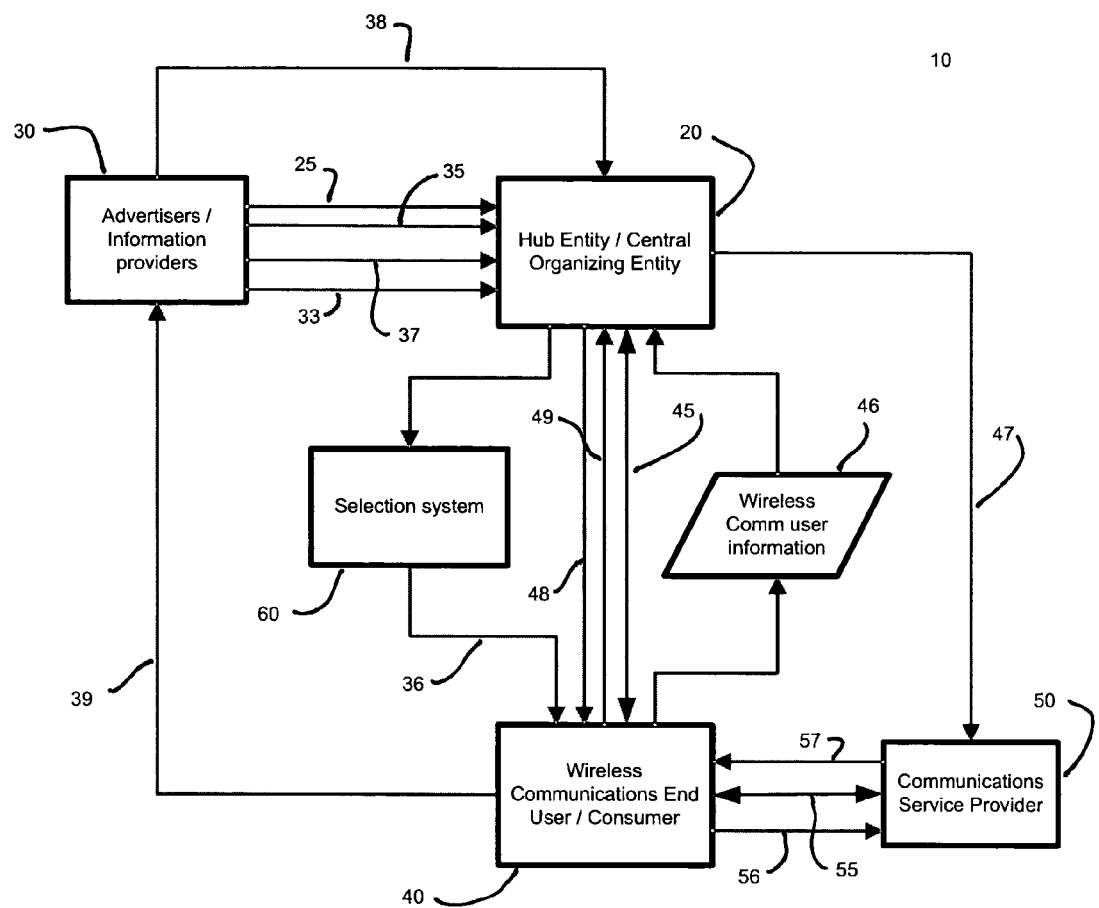
FIG. 2: is a flowchart of a second embodiment of the inventive business method for directing advertising to wireless communication device users with the hub entity directly paying the wireless communications service provider.

A rudimentary example of the inventive method applied to directed advertising is illustrated in the flowcharts of FIGS. 1 and 2. While these figures show an example for directed advertising, the illustrated example is equally applicable to a non-advertising embodiment where instead of advertising, other non-advertising information or notices are transmitted by an information provider through the hub entity to targeted wireless network end-users. For example, and not by limitation, the information provider could be a sponsor or underwriter for an advertised event, or sponsoring or underwriting an organization's campaign.

As illustrated in the FIG. 1 flowchart, the first element of the method 10, the hub entity 20, communicates with the second element, the advertisers or information providers 30. The advertisers 30 want to have their advertising messages 35 directed or targeted to those consumers who are in the market for that particular advertisers' products, services or information. An agreement 33 could be entered into as between the advertisers 30 and the hub entity. Under such an agreement 33, the advertisers 30 would provide the hub entity 20 with the advertisements or information 35 that the advertisers 30 wish to have transmitted to the target consumers. The advertisers 30 also pay the hub entity 20 a service fee 25 for collecting the advertisements 35, and coordinating the transmission of the advertisements 35 to the particular or targeted consumers. The services provided by the hub entity 20 are the controlled and directed transmitting of the advertising information 35 to specific consumers through the wireless communications network.

The third element, as shown in FIGS. 1 and 2, are the wireless communications network users 40 ("wireless system end users") who enter into an agreement 45 with the hub entity 20. Under the agreement 45, the wireless system end users 40 agree to receive a pre-selected number of advertisements 36 transmitted through the wireless system end user's wireless device during a pre-selected period of time. Such wireless devices could include cell phones, mobile pagers, Blackberry™ devices, satellite phones, and others.

The advertisements 36 are "pre-selected" in that the wireless system end user 40 has identified those particular advertisers or types of advertisements as being of interest to the wireless system end user 40. The selection process 60 may be accomplished by computer software that evaluates the data from the end users 40 with the data provided by the advertisers 30, and through such analysis matches or selects from the advertising information 35 a subset of advertisements 36 that are most relevant to be transmitted to the wireless system end users 40. For example, the wireless system end user 40 may agree to receive twenty particular type of advertisements 36 ("ads") of interest each day. In a preferred embodiment, the wireless system end user 40 enters into the agreement 45 with the hub entity 20 in part because he or she will receive a fee 47 for each advertisement 36 that the wireless system end user 40 agrees to, and actually does, receive through the wireless system end user's wireless device. The wireless system end user fee 47 alternatively can be a specific amount for each ad 36 transmitted to the wireless system end user 40, or the fee 47 could be a function of the standard text-messaging fee charged by the wireless system end user's 40 wireless communications service provider 50, plus an additional amount possibly based upon the number of ads 36 received. As such, the disclosed method and system provide an effective means for wireless system end users 40 to have some or all of their wireless communications service bills to be paid for or reimbursed by third party advertisers 30 or sponsors.

As part of the agreement 45 between the wireless system end user 40 and the hub entity 20, the wireless system end user 40 must provide the hub entity 20 with certain identification information 46. As a minimum, the wireless system end user 40 must provide the hub entity 20 with the wireless system end user's 40 identification information, or provide authorization for the hub entity 20 to obtain such information. The identification information 46 would include at least the wireless system end user's wireless device identification number, such as a cellular telephone number. Further, such information 46 should include the wireless system end user's 40 selection of the number of ads 36 that the wireless system end user 40 agrees to receive from the hub entity 20. Additionally, for the method to be most effective, the wireless system end user 40 should also provide to the hub entity 20 private and/or proprietary information 46 about the wireless system end user's personal, purchasing or informational interests. The wireless system end user 40 could also provide to the hub entity 20 additional general information that could be used by the hub entity's selection process 60 to identify, select and transmit other meaningful information or advertisements to the wireless system end user 40. Through use of such wireless system end user information 46, the hub entity 20 is in a position to more effectively select and direct the most relevant and desired advertisements 36 and information to the consumer/wireless system end user 40. That is, the method is most effective for the advertisers 30, and of the most benefit to the wireless system end user 40, where the wireless system end user's needs as a consumer are appropriately matched with the advertisers or producers 30 who are seeking to advertise and commercialize their products that are being sought by the consumer/wireless system end user 40.

The fourth element of the method 10, being the wireless communications service provider 50, has its standard service contracts 55 with its wireless system end users 40, such that the wireless system end users 40 pay the service provider 50 a periodic fee 56, typically a monthly service fee, under an annual or multi-year contract, in return for the service provider 50 providing the wireless system end user 40 with wireless communications service 57. As noted, the wireless communications service provider could be a cellular service provider or a telecommunications provider ("telecom").

At the core of the business method 10, as described above, is the process by which the wireless system end users 40 are paid a fee 47 for each advertising "call" 36 they agree to receive. This fee 47 provided to the wireless system end user 40 is funded by the advertisers 30 who pay the hub entity 20 a fee 25 for the hub entity's service of selecting from the advertising 35 the appropriate advertisements or information of interest 36 to be transmitted to a specific wireless system end user, which can be either an individual wireless system end user or one or more relevant interested target groups. As such, according to the disclosed business method, the wireless system end user 40 may have part or all of its wireless system service charges offset or paid for by advertisers through the hub entity 20.

FIG. 1 shows a preferred embodiment where the hub entity 20 pays the fee 47 directly to the wireless system end user 40 based upon the number of selected ads 36 transmitted to the wireless system end user's wireless communications device. Alternatively, in another preferred embodiment, FIG. 2 shows the flow of a method where the hub entity 20 pays a fee 47 to the wireless system end user's service provider 50 on behalf of the end user 40. In this FIG. 2 embodiment, the service provider 50 would then reduce or eliminate the normal periodic bill sent to the wireless system end user 40 based upon the number of ads 36 transmitted to the wireless system end user's wireless communications device and based upon the amount of fees 47 paid to the service provider 50 by the hub entity 20.

If the number of ads 36 transmitted to the wireless system end user's wireless communications device is large enough, or if each fee 47 paid to the wireless system end user 40 is large enough, there is the possibility that the entire wireless communications device periodic bill of the wireless system end user 40 could be covered by the fees 47 "earned" by the end user 40. In such a situation, where the fees 47 paid to the service provider 50 exceed the monthly bill of the wireless system end user 40, the service provider 50 could either return the excess fees 47 to the hub entity 20 or to the wireless system end user 40, or the service provider 50 could provide additional services, including additional wireless services (e.g., system or cellular minutes) to the wireless system end user 40 as a direct function of the amount of excess fees 47.

As shown in FIG. 1, in another preferred embodiment of the invention, the hub entity 20 could require that each wireless system end user 40 provide to the hub entity 20 a subscription fee 49 to sign up for receiving targeted advertising and/or receiving selected information. Such a subscription fee 49 could be an initial one-time fee, or could be a periodic charge for being a member of the system maintained by the hub entity 20. Accordingly, in one preferred embodiment the subscribing end user 40 does not pay any fee 49 to be within the hub entity 20 system or data base, and in another preferred embodiment, the subscribing end user 40 is required to pay a fee 49 to be part of the hub entity 20 system or data base. The decision to charge a fee 49 for each end user to subscribe to the directed advertising or information providing system may be made by the hub entity 20 based upon ability for costs to be covered by means other than the end users.

From the perspective of the advertisers 30, a benefit provided by the inventive method is that they are better able to focus advertising budgets directly to particular individual and group subscribers (potential purchasers) who have an expressed interest in the advertisers' products or services. The interest is "expressed" because the wireless system end users 40 have provided specific and/or general information 46 to the hub entity 20 identifying their particular product, service, or business interests. The hub entity 20 benefits as a business by the income or commission taken as a portion of or percentage of the fees 25 collected from the subscribing advertisers 30 and/or fees 49 collected from the wireless system end users 40.

There are many aspects of the inventive method and system 10 that make it attractive for wireless system end users 40, as well as for advertisers or goods and services producers, in addition to other entities wishing to reach particular subscribers. First, the wireless system end users 40 are given the flexibility of deciding on the number of advertising "calls" 36 they each would like to receive, and also in selecting the type of advertising or information calls they each would like to receive. With respect to the type of advertising call, the wireless system end user 40 could identify a type of advertisement or business (food; electronic equipment; books; airlines/travel; etc.) of interest, or could identify a particular advertiser (ABC Pizza; XYZ Books; ABZ Airlines) for which they would like to receive information or advertisements.

The above example noted that the wireless system end user 40 may agree to receive twenty "ads" each day. As such, the wireless system end user 40 is not inundated with the equivalent of advertising spam on his or her wireless communications device. Moreover, because the wireless system end user 40 has provided the hub entity 20 with certain private and proprietary information 46 about the wireless system end user's commercial interests, the "ads" 36 transmitted to the wireless system end user's wireless communications device are, by definition, of interest to the end user 40.

Second, from the perspective of the advertiser, or sponsor/underwriter, the method and system 10 provide a means of precisely tracking the effectiveness of the targeted and directed advertising. In one preferred embodiment, as shown in FIG. 1, the advertiser 30 can provide the hub entity 20 with specific advertising codes 37 that are transmitted along with the "ads" 36 to the wireless system end user 40. The wireless system "ad" 36 could provide that if the wireless system end user 40 purchases particular products or services from the advertiser 30 within a set period, for example the next 24 hours, and also identifies the transmitted code 37 as part of the purchase, then the product or service will be provided at a particular discount or provider with some other benefit. This provides an incentive for the wireless system end user to decide upon this particular advertiser over other competitors because there is the inducement of reduced cost or another particular benefit for the wireless system end user 40. Moreover, the advertiser 30 receives immediate feedback on the effectiveness of the advertising campaign because the advertiser 30 can track which purchases 39 were made with the identified wireless system transmitted code 37.

This "coded" purchasing information 38 can also be used by the hub entity 20, as illustrated in FIGS. 1 and 2, as useful feedback from the advertiser. More particularly, with the coded purchase information 38 provided back from the advertiser 30, the hub entity 20 is able to compare how many purchases 39 were made using the code 37, with the number of "coded" ads 36 that were transmitted to subscribing wireless system end users 40. The hub entity 20 can accordingly track, update and improve the selection process 60 (e.g., the system software and database) and screening used to match particular wireless system end users 40 with certain advertisers 30. Ideally, the selection process 60 is a computer software system using an extensive data base of information provided by the advertisers 30 and the wireless system end users 40.

A third aspect or specific benefit to advertisers 30 is an embodiment of the method where, in addition to agreeing to receive a set number of selected "ads" 36 that are identified as being of interest to the wireless system end user 40, the end user 40 agrees to also receive a limited number of random, or not selected ads. For example, the wireless system end user 40 could agree to receive twenty "ads" each day from businesses of interest to that wireless system end user 40, and to also receive an additional five "ads" each day from a pool of subscribing businesses 30 that have not been selected by the end user 40. The wireless system end user 40 is still paid a fee 47 for each of the twenty plus five "ads" he or she receives. The wireless system end user 40 is accordingly paid to receive the selected advertising messages, as well as receiving a limited number of general or randomly selected advertising messages. Again, the wireless system end user 40 is protected from being swamped with unwanted advertising messages, while still providing an additional means to reduce his or her wireless communications service bill. The advertisers 30 have the benefit of having their advertising message distributed to a wider consumer audience and to potentially encourage a purchase from a consumer who did not necessarily intend to be in the "market" for that particular advertiser's products.

An important element of the method 10, as illustrated in FIGS. 1 and 2, and as incorporated in all embodiments of the inventive method, is that the wireless systems end user's private, proprietary, and general information 46 is maintained separate and confidential from the advertisers 30. The hub entity 20 is the keeper of the wireless systems end user's private and general information 46. This end user/subscriber information 46 collected by the hub entity 20 is, from an advertiser's perspective, valuable potential client information. In a preferred embodiment, the hub entity 20 would, under the wireless end user subscriber agreements 45, agree to strictly maintain all end user information 46 as highly confidential. The wireless system end user 40 is thus protected from having his or her wireless communications device identification and commercial interests or general information 46 improperly disseminated to third parties. The hub entity 20 provides a level of communication protection for the wireless system end user 40 and can prevent contact from any advertiser, sponsor or underwriter to any end user 40 at the request of the end user 40.

FIGS. 1 and 2 also show another means for income to be accrued or generated for the wireless system end user 40. In the illustrated embodiments, the hub entity 20 could agree to pay to a subscribing end user 40 a referral or finder's fee 48 for each new subscriber that enters into an agreement 45 with the hub entity 20.

The above method and system embodiments have been illustrated for an advertising system. However, as noted the same method and system have direct and equally effective application where instead of advertisements, information is transmitted to the wireless system end user. The following are several more specific examples of the inventive method and system illustrating wireless transmission of advertising and information from advertisers or information providers to wireless system subscribers. Each of these embodiments are based upon and build upon the basic method and systems shown in FIGS. 1 and 2.

Organization Funding and Referral Fees

Figure 3:
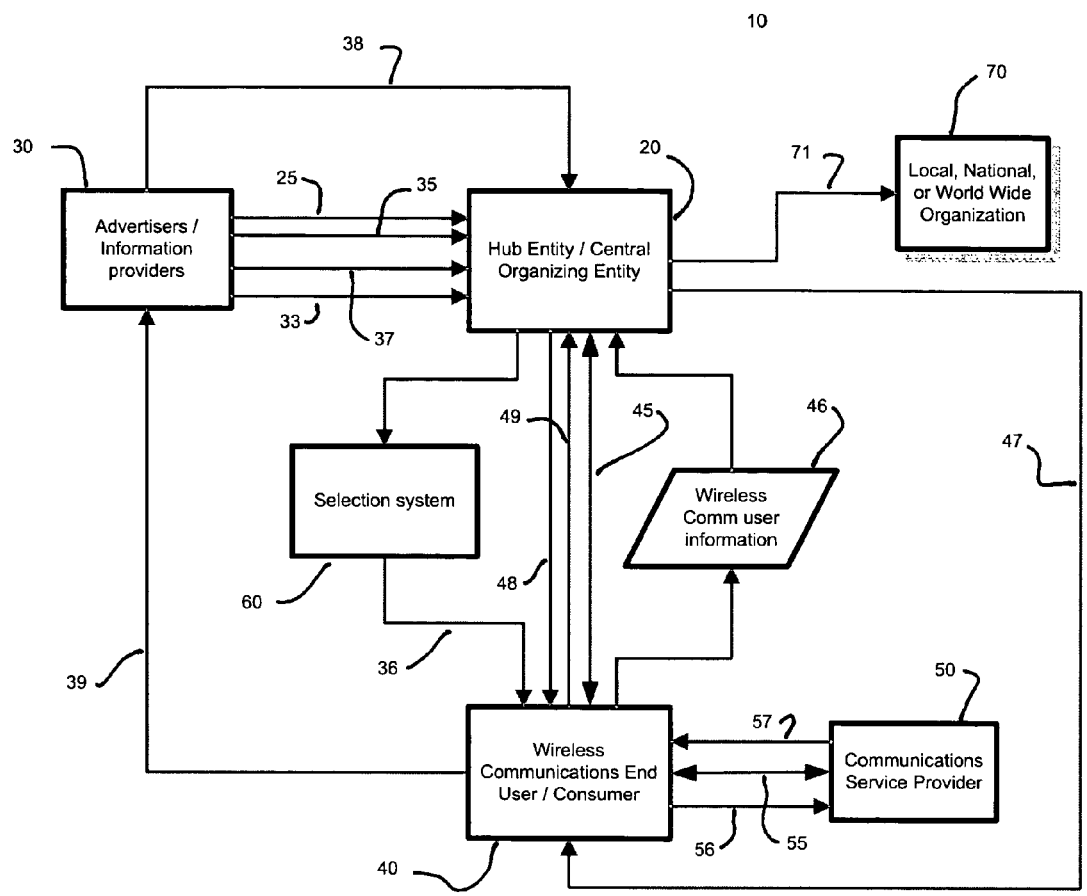
FIG. 3: is a flowchart of an embodiment of the inventive business method for directing a portion of advertising fees to a selected wireless communication device user's national organization.

A group of wireless system end users may wish to donate a portion of the fees 47 earned by and to be paid to each end user 40, to the group's organization or to a charity 70. More specifically, as shown in FIG. 3, an organization 70, such as a school fraternity or a charity, in which a group of wireless system end users 40 are members, may receive a portion of the fees 47 paid to end users 40. While it may not appear that the organization 70 would be receiving any substantial amounts from the hub entity 20, if the number of organization member end users 40 is large enough, then the amounts to be paid to the organization can reach significant numbers.

Only by way of example, if the wireless system end users 40 agree to receive twenty ads 36 each day, and one hundred end user/organization members 40 agree to send a portion of their earned fees 47 to the organization 70, then there are 2000 fee generating ads each day (20×100). If each fee generating ad provides $0.01 for the organization 70, then each day the organization has earned $20; and each month it will have earned approximately $600 (20×30); and each year it will have earned approximately $7200 (600×12). Relatively quickly the fees generated for the organization, be it a fraternity or charity, can be substantial. Indeed, whether the organization is local, national or international, the potential return to the organization can be substantial where the number of subscribing members 40 is large.

Figure 3A:
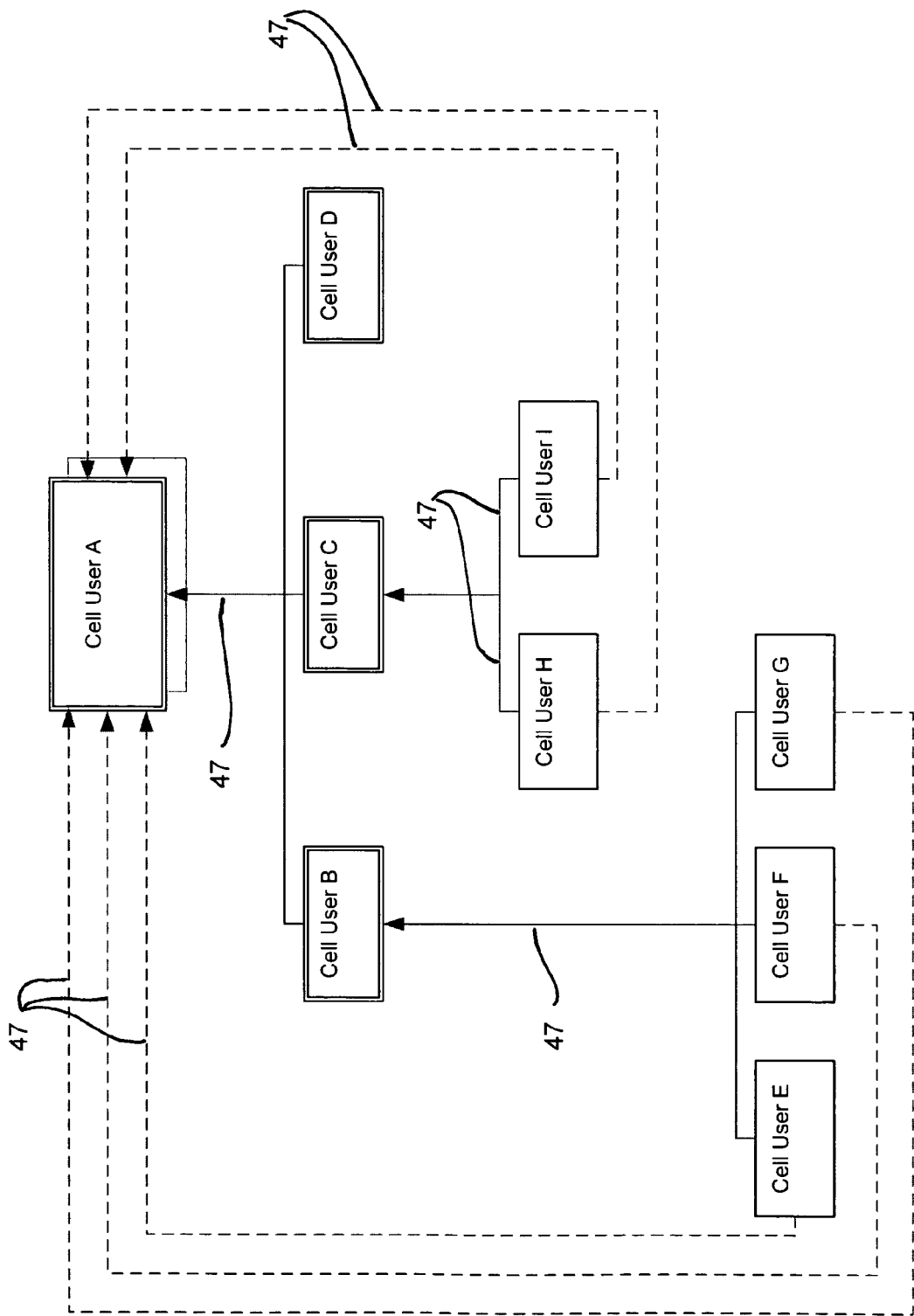
FIG. 3A: is an example of referral connections and fee distributions.

In another related preferred embodiment of the present invention having particular application to an organization's members subscribing to the system, each subscribing member 40 that refers or "signs up" another subscribing member 40 can be rewarded by having a portion of the "referred" member's fees 47 provided to the "referring" subscriber. For example, as shown in FIG. 3A, if A is a subscribing member and refers or signs up B, C and D, then, in the disclosed embodiment, a portion of the fees 47 earned by B, C and D would be paid to A. Similarly, if B then signs up E, F, and G, and C signs up H and I, A would earn not only a portion of the fees 47 paid to B, C, and D, but also a portion of the fees 47 paid to E, F, G, H and I. In one reasonable embodiment of this system, the portion of the fees earned by the referring wireless system end user 40, would diminish for each level that the referred members are removed. As such A would earn a larger percentage from B, C and D (being the direct referrals) than A would earn from E, F, G, H and I, who are second level referrals.

While this preferred embodiment has particular application to an organization's members, who may be more inclined to become end users/subscribing members 40 where other members from the organization can be referred, the referring flow is equally applicable to any subscribing wireless system end users 40, including family members, or friends and acquaintances.

Credit Card Company Purchase Information

Figure 4:
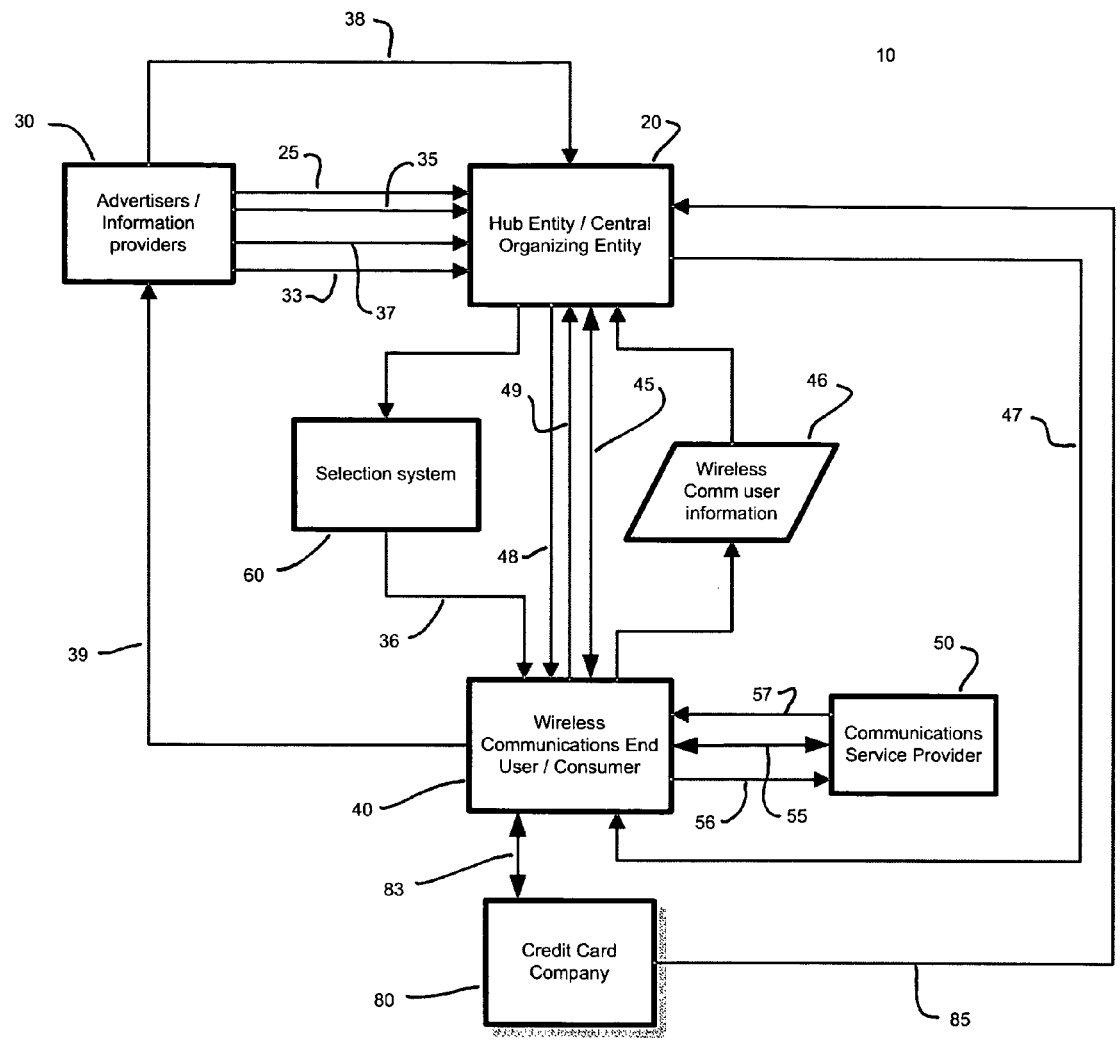
FIG. 4: is a flowchart of an embodiment of the inventive business method for directing advertising to wireless communication device users using information provided by the wireless communication device user's credit card company.

In another embodiment of the method, as shown in FIG. 4, additional purchase information may be provided to the hub entity 20 to track the wireless system end user's purchasing trends. Such information exists and is maintain by the wireless system end user's credit card company 80. In this example of the inventive method, the credit card company 80 would offer to its card holders/end users 40 an opt-in or authorization 83 to allow the credit card company 80 to provide purchasing history information 85 to the hub entity 20. Only upon the receipt of the authorization 83 of the cardholder/end user 40 would the credit card company 80 transmit any information 85 about the cardholder/end user's purchases to the hub entity 20. The hub entity 20 could use this historical purchasing information 85 to better track its subscribers' desires and consumable interests. By using this additional data, the hub entity would be better able to match ads from advertising subscribers 30 with the wireless system end user/subscribers 40. The hub entity 20 could use this information 85 to update and improve the software or selection algorithm 60 used to select which ads 36 are directed to which wireless system end users 40. Thus, the hub entity 20 would be able to improve the effectiveness of the advertising subscriber's investment, and would provide the wireless system end user 40 with the most appropriate and useful ads 36.

Other examples, provided without limitation, of entities similar to a credit company 80, that have particular information about the wireless end user/subscribers 40, are mortgage companies (which collect financial information and have records of payment and credit histories), investment companies (which have information relating to investment portfolios and investment interests), and on-line product providers, such as e-Bay or Amazon.com (which have purchasing histories). Each of these types of information collecting entities could substitute for the credit card company 80 in the FIG. 4 embodiment, or these entities could be added to the FIG. 4 embodiment as further sources of general and specific information given to the hub entity 20 that relate to the end user 40.

Information Provider

As described, the inventive method is applicable to transmitting information, instead of advertisements, to wireless system end users 40. Examples of such information include, weather notices, specific tornado alerts, security notices or alerts, as well as relatively less urgent information about the end user's bank account.

Figure 5:
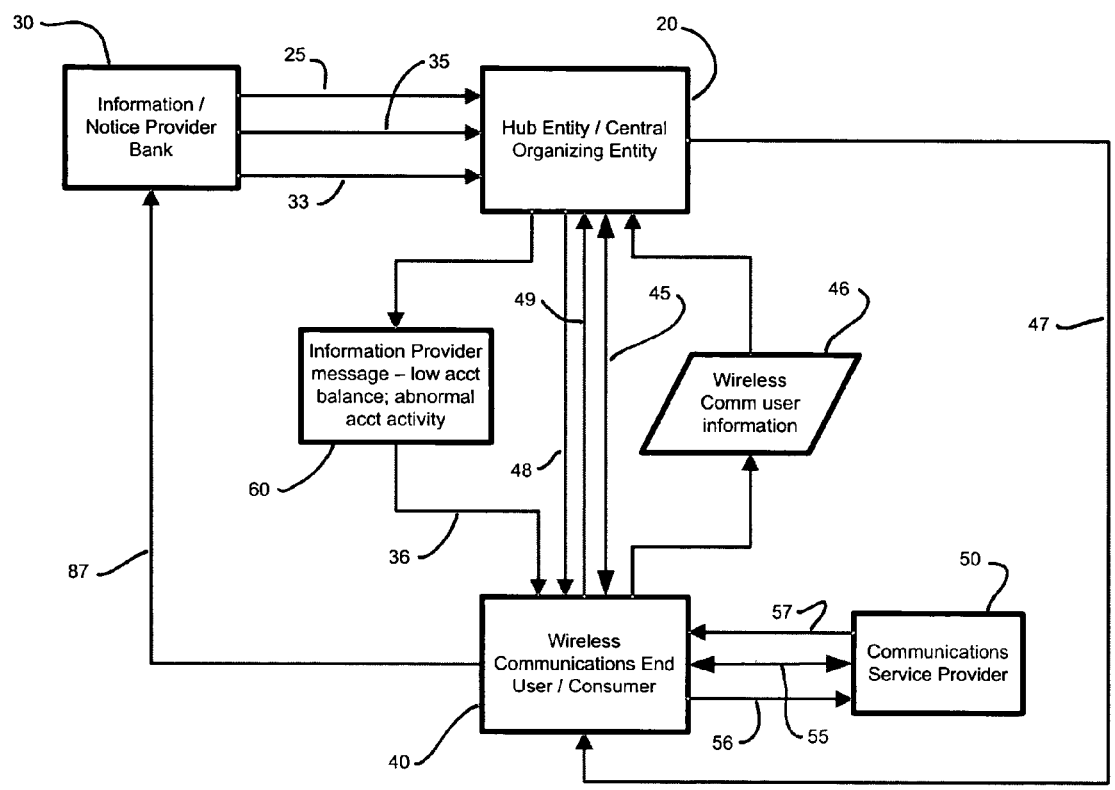
FIG. 5: is a flowchart of an embodiment of the inventive business method for directing bank account information to wireless communication device users.

FIG. 5 shows a flowchart of an example method 10 for a bank to provide subscribing wireless system end users 40 with notices 36 regarding account low balances. In this method, when a bank customer/end user's 40 account reaches a lower threshold, the bank computer system automatically advises the hub entity 20 of this condition, which generates a message to be transmitted to that bank customer/end user 40. The wireless system end user 40 is thus apprised immediately when his or her account is in danger of being overdrawn or being lower than a specified limit.

This method and system 10 is also applicable where the bank or a credit card company monitors activity within an account or credit card account. If such activity is abnormal, the bank would advise the hub entity 20 of this abnormal activity, which would then generate a message 36 transmitted to the wireless system end user 40. The wireless system end user 40 may be required to pay the bank 30 a separate fee 87 in order to receive the information notices 36 from the hub entity.

Figure 6:
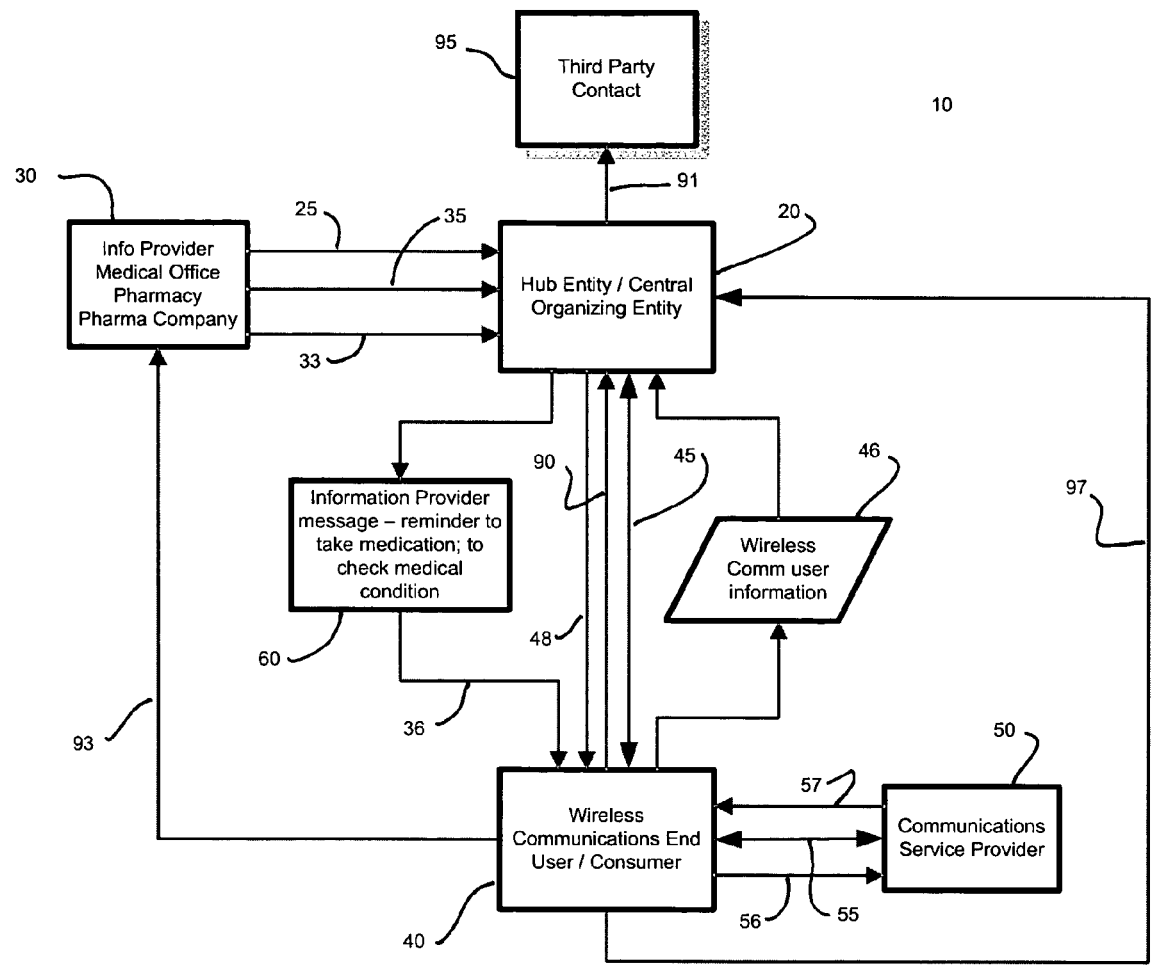
FIG. 6: is a flowchart of an embodiment of the inventive business method for directing medical information to wireless communication device users.

Another example of such information transmission is shown in FIG. 6. In this example, the method and system is used to provide medical reminder information to patients/wireless system end users 40. The patient would subscribe 45, 93 with the hub entity 20 and a medical entity 30, which could be a doctor's office, a pharmacist, or an insurance company, to have reminders transmitted to the patient's wireless communications device when a certain activity is to be undertaken. Such activity could be to take certain medications, or to check the patient's blood pressure or blood sugar levels. In this embodiment, as shown in FIG. 6, the method could be configured to require a return message or contact 90 from the patient to close the loop that the required activity was in fact completed. If there is no return message or contact 90 from the patient, then, as shown in FIG. 6, the hub entity could send another reminder message 36, or alternatively send an alert 91 to a third party 95, which could be a doctor, relative or other identified contact. In this embodiment, the hub entity 20 could collect fees 97, 25, to cover the costs of operating the system, from the wireless system end users 40, and/or from the medical entity/information provider 30, which again could be an insurance company, a pharmacist, a doctor's office, or a pharmaceutical company.

The reminder notification example illustrated in FIG. 6 also has application for assisting those enrolled in behavior modification programs. For example, a program to assist those who wish to stop smoking, or have a weight problem, or those who have a drug dependency, can use this method to provide reminders 36 to not smoke, or to select a healthy diet, or to continue with an exercise regimen.

Another preferred embodiment of the inventive method and system relates to both targeted advertising as well as information providing. An example of such a system and method could be a convention or seminar. Attendees to a convention could register with a hub entity 20 to receive through their wireless communication devices (1) desired advertising information about the city or location of the convention, and (2) necessary convention information relating to scheduling, and presentation locations. The attendees of the convention/end users 40 receive the benefit of the targeted advertising 36, which could include advertisements, discounts and information about local restaurants, hotels, rental car facilities, or business needs (such as courier or copying services). Similarly, the advertisers 30 receive the benefit of a particular audience of consumers who have a direct need of the goods and services being offered by the advertisers 30. The additional benefit for the attendee/end user 40 is that he or she will receive immediate notification relating to information about the convention, which could include, without limitation, changes to scheduling, and reminders of particular programs or presentations, and/or requests for meetings between attendees/end users.

Even before or after the convention, the attendee 40 could receive the benefit of directed advertising relating to the convention where the hub entity 20 could transmit advertisements 36 from businesses that are local to the attendee's/wireless system end user's 40 home location. That is, the attendee 40 could receive advertisements from advertisers 30 in the area of the attendee's home, that relate to the subject of the convention after the attendee 40 returns home from the convention.

Another example of using the inventive method to provide information would be where the wireless system end user 40 subscribes to receive instructions or information for administering cardio-pulmonary resuscitation ("CPR"), or instructions for stabilizing an accident victim, if the end user 40 requests such information. Such information could be automatically offered or provided if the wireless system end user enters a preprogrammed emergency code to access such information, which could be stored into the memory of the wireless communication device as a "soft" key. The information provider 30 in this example could be a local hospital, an ambulance service, or a pharmaceutical company wishing to present and associate their name with the positive message of saving lives. Either or both the wireless system end user 40 and the information provider 30 could pay all or part (e.g., sponsorship) of the subscription fee to the hub entity 20 to receive this emergency information.

Alert Notification

Figure 7:
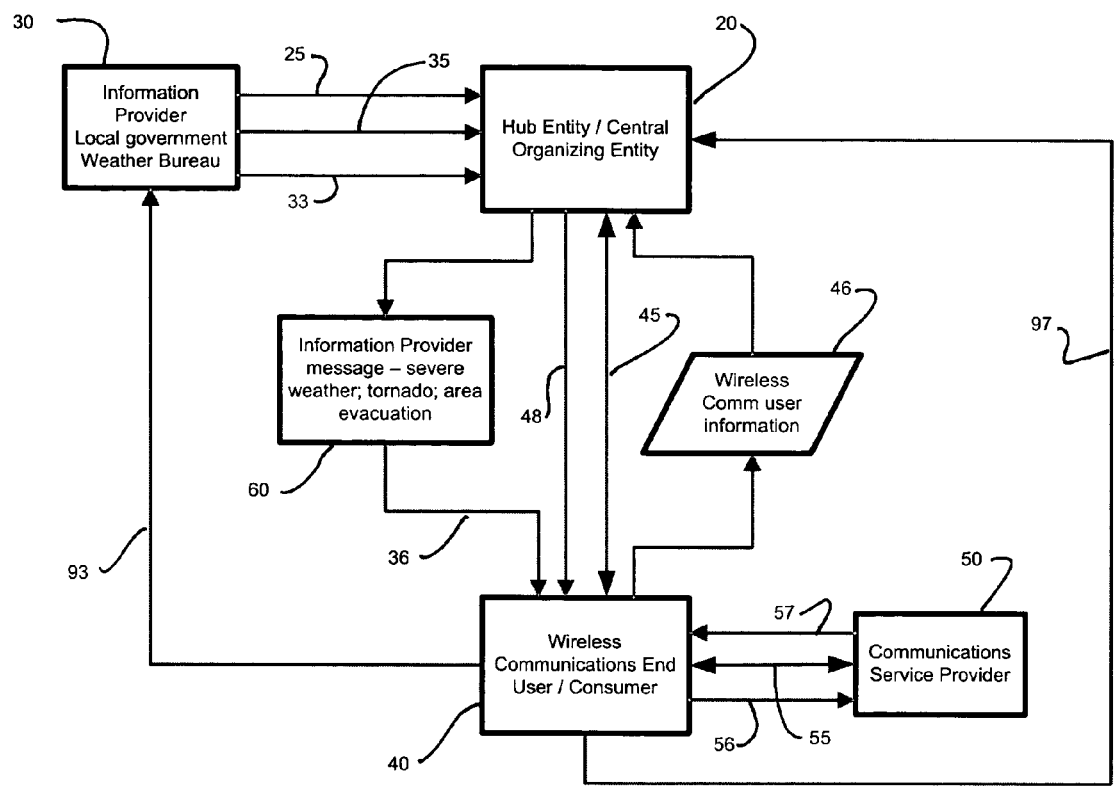
FIG. 7: is a flowchart of an embodiment of the inventive business method for directing weather notices to wireless communication device users.

A more specific example of the above information provider embodiment disclosed above, is where critical and time sensitive notice information can be automatically transmitted to subscribing wireless system users 40. As illustrated in FIG. 7, the method 10 can be used to provide weather condition alerts 36 to subscribing users 40. Such alerts can take the form of text messages of approaching tornadoes, or mandated hurricane evacuations. The information providing entity 30 that is supplying the information to the hub entity 20 can be a local government, a weather bureau, or even the weather channel. In a preferred embodiment, the subscribing user 40 could subscribe or request that the weather or other similar information be transmitted at a particular number of times each day or hour in order to be able to monitor changing conditions.

Another example of providing critical information to subscribing users 40 is where residents of particular cities, townships, or neighborhoods, which could be defined by a zip code or other geographic identifier, wish to receive public information relating to the registration of sex offenders in those particular cities, townships or zip codes.

In this type of embodiment, the wireless system subscriber 40 may have to pay a fee 97 for the service of being notified of governmental or situation alerts. However, such fees 97 could be completely or partially subsidized or sponsored by the local government as a public service. Indeed, the fees could also be fully or partially sponsored by a private business entity 30 seeking to marketing their goods or services along with the notice provided to the wireless system end users 40.

Figure 8:
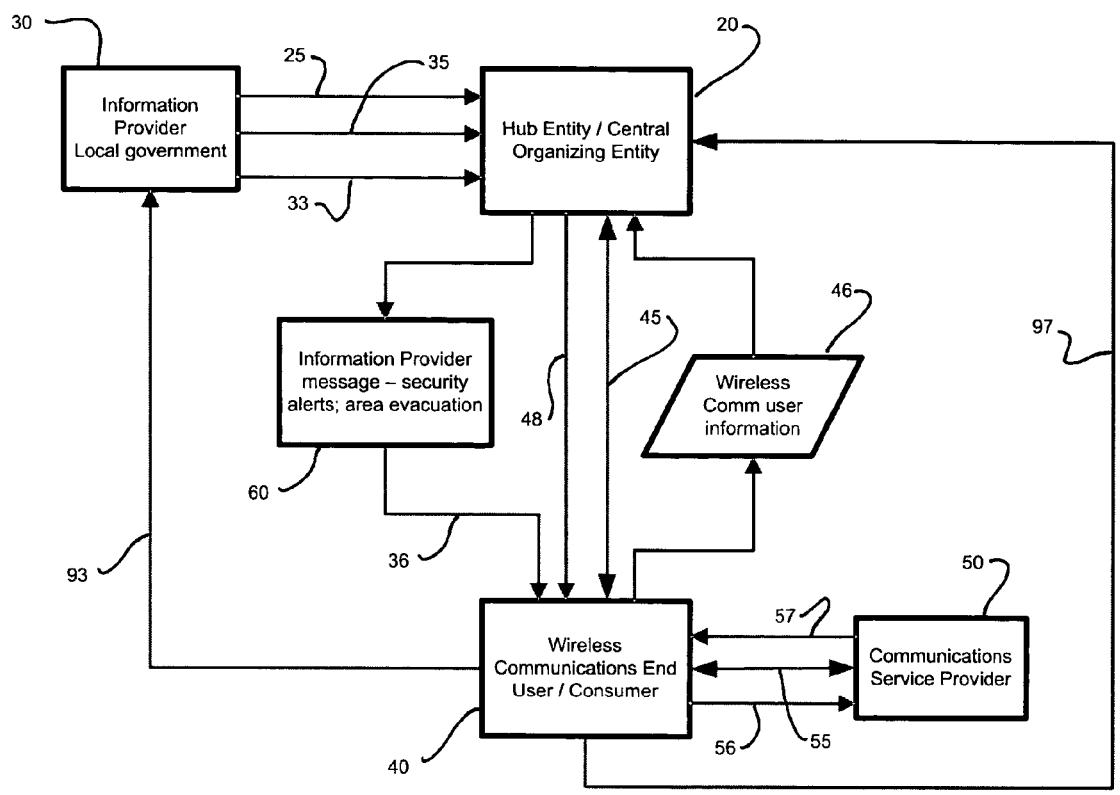
FIG. 8: is a flowchart of an embodiment of the inventive business method for directing security alerts and notices to wireless communication device users.

A similar example of an alert notification use is in the security arena. With Homeland Security, infrastructure security, and terrorism alerts becoming more prevalent, the inventive method and system 10 has direct application to address these public needs. For example, as shown in FIG. 8, wireless system end users 40 could subscribe with the hub entity 20 to receive text message notices of security alerts 36, which could include evacuation notices, information about system failures (train system or subway failures, or road closures), or other information about homeland security breaches. In this example, the information provider 30 may again be a governmental entity, either local or national. The local government 30 transmits the message to the hub entity 20, which in turn automatically transmits the message 36 to the subscribing wireless system end users 40 through their wireless communication devices.

The above detailed description teaches certain preferred embodiments and examples of the present inventive method and system for directed advertising and information distribution using a wireless communications system or network. While preferred embodiments and examples have been described and disclosed, it will be recognized by those skilled in the art that modifications and/or substitutions are possible and such modifications and substitutions are within the true scope and spirit of the present invention. It is likewise understood that the attached claims are intended to cover all such modifications and/or substitutions.

What is claimed:

1. A method for conducting targeted advertising using a wireless communications network, the method having a central organizing entity using at least one computer processor, subscribing advertisers, subscribing consumers, and a communications service provider, the method comprising the steps of:
   a. receiving from the subscribing advertisers, advertising information to be transmitted to a targeted set of the subscribing consumers, and storing said advertising information in the at least one computer processor;
   b. receiving from the subscribing advertisers, information describing an intended set of recipient consumers, and storing said intended recipient consumers information in the at least one computer processor;
   c. collecting from the subscribing advertisers, a fee for transmitting the advertising information to the targeted set of subscribing consumers;
   d. receiving from each of the subscribing consumers over a wireless communications network, first information describing each subscribing consumers' wireless communications identification information, and storing said first information in the at least one computer processor;
   e. receiving from each of the subscribing consumers over a wireless communications network, second information describing each subscribing consumers' preferences for receiving advertising information, and storing said second information in the at least one computer processor;
   f. determining from analysis by the at least one computer processor specific subscribing advertisers' advertising information to be transmitted, over a wireless communications network, to a first subset of the subscribing consumers who have identified a desire to receive the specific subscribing advertisers' advertising information;
   g. transmitting over a wireless communications network the specific subscribing advertisers' advertising information to the subset of subscribing consumers who have identified a desire to receive the specific subscribing advertisers' advertising information; and
   h. distributing to the subset of subscribing consumers who have received the specific subscribing advertisers' information, a fee for each specific advertising information transmitted to the subset of subscribing consumers.

2. The method for conducting targeted advertising using a wireless communications network, as provided in claim 1, wherein step g. is:
   transmitting over a wireless communications network a preselected number of the specific subscribing advertisers' advertising information during a preselected time period to the subset of subscribing consumers who have identified a desire to receive the specific subscribing advertisers' advertising information.

3. The method for conducting targeted advertising using a wireless communications network, as provided in claim 1, wherein step g. is:
   transmitting over a wireless communications network approximately less than 25 of the specific subscribing advertisers' advertising information during an approximate 24 hour period to the subset of subscribing consumers who have identified a desire to receive the specific subscribing advertisers' advertising information.

4. The method for conducting targeted advertising using a wireless communications network, as provided in claim 1, further comprising additional step:
   g1. transmitting, over the wireless communications network, to the first subset of subscribing consumers, during a preselected time period, a preselected limited number of subscribing advertisers' advertising information not selected in step f.

5. The method for conducting targeted advertising using a wireless communications network, as provided in claim 1, further comprising additional step:
   e1. receiving from each of the subscribing consumers over a wireless communications network, third information relating to general information about each subscribing consumers, and storing said third information in the at least one computer processor.

6. The method for conducting targeted advertising using a wireless communications network, as provided in claim 1, wherein step h. is:

distributing to the communications service provider a fee for each specific advertisement transmitted to the subset of subscribing consumers who use said communications service provider's communications network.

7. The method for conducting targeted advertising using a wireless communications network, as provided in claim 1, further comprising additional step:

e1. collecting from each subscribing consumer a subscription fee for providing the service of transmitting the advertising information to the subscribing consumer.

8. The method for conducting targeted advertising using a wireless communications network, as provided in claim 1, wherein step h. is:

receiving from at least one of the subscribing consumers, the identity of an organization to which a portion of the earned subscribing consumers' fees are to be distributed; and further comprising new steps:

i. distributing to the subset of subscribing consumers who have received the specific advertisers' information, a first portion of the earned subscribing consumers' fee for each specific advertising information transmitted to the subset of subscribing consumers; and j. distributing to the identified organization, a second portion of the earned subscribing consumers' fee for each specific advertisement transmitted to the subset of subscribing consumers.

9. The method for conducting targeted advertising using a wireless communications network, as provided in claim 1, further comprising the additional steps:

d1. receiving from at least one of the subscribing consumers over a wireless communications network, authorization to receive information relating to the subscribing consumers' purchasing history, from at least one of the subscribing consumers' credit card companies;

d2. receiving from the at least one of the subscribing consumers' credit card companies, information relating to the subscribing consumers' purchasing history.

10. The method for conducting targeted advertising using a wireless communications network, as provided in claim 1, further comprising the additional steps:

i. receiving from the subscribing advertisers, information showing purchases made by the subset of subscribing consumers who received the specific advertisers' information over the wireless communications network;

j. tracking from analysis by the at least one computer processor the effectiveness of the step f. selection process with the purchases information received from the subscribing advertisers; and k. revising the step f. computer processor determination process based upon the tracking of the selection effectiveness step.

11. The method for conducting targeted advertising using a wireless communications network, as provided in claim 1, wherein the wireless communications network is a cellular media network and the wireless communications identification information is each subscribing consumer's cellular identification information.

12. A method for transmitting information using a wireless communications network, the method having a central organizing entity using at least one computer processor having at least one computer data base, subscribing information providers, subscribing recipients, and a communications service provider, the method comprising the steps of:

a. receiving from the subscribing information providers, information to be transmitted to a targeted set of the subscribing recipients, and storing said information in the at least one computer processor data base;

b. receiving from the subscribing information providers, information describing an intended set of recipients, storing said intended recipients information in the at least one computer processor data base;

c. collecting from the subscribing information providers, a fee for transmitting the advertising information to the targeted set of subscribing recipients;

d. receiving from each of the subscribing recipients over a wireless communications network, first information describing each subscribing recipient's wireless communications identification information, and storing said first information in the at least one computer processor data base;

e. receiving from each of the subscribing recipients over a wireless communications network, second information describing each subscribing recipient's preferences for receiving information, and storing said second information in the at least one computer processor data base;

f. determining from analysis by the at least one computer processor specific subscribing information providers' information to be transmitted, over a wireless communications network, to a first subset of the subscribing recipients who have identified a desire to receive the specific subscribing information provider's information;

g. transmitting over the wireless communications network the specific subscribing information provider's information to the subset of subscribing recipients who have identified a desire to receive the specific subscribing information provider's information; and h. distributing to the subset of subscribing recipients who have received the specific subscribing information provider's information, a fee for each specific information transmitted to the subset of subscribing recipients.

13. The method for conducting targeted advertising using a wireless communications network, as provided in claim 12, wherein step g. is:

transmitting over a wireless communications network a preselected number of the selected specific subscribing information provider's information during a preselected time period to the subset of subscribing recipients who have identified a desire to receive the specific subscribing information provider's information.

14. A method for providing information over a wireless communications network, the method having a central organizing entity using at least one computer processor having at least one computer data base, information providers, subscribing wireless communications network users, and a communications service provider, the method comprising the steps of:

a. receiving from the subscribing information providers, a first set of information to be transmitted to a targeted set of the wireless communications network users desiring to receive said information, and storing said first set of information in the at least one computer processor data base;

b. collecting from the information providers a fee for transmitting the first set of information to the targeted set of subscribing wireless communications network users;

c. receiving from each subscribing wireless communications network user over a wireless communications network, the subscribing wireless communications network user's identification information, and storing said identification information in the at least one computer processor data base;

d. receiving from each subscribing wireless communications network user over a wireless communications network, a description of information desired to be received by the subscribing wireless communications network user, and storing said information desired to be received in the at least one computer processor data base;

e. collecting from each subscribing wireless communications network user a fee for transmitting the desired information to the subscribing wireless communications network user;

f. determining from analysis by the at least one computer processor of the information providers' first set of information, information substantially matching the description of desired information received in step d., for a subset of the subscribing wireless communications network users; and g. transmitting, over a wireless communications network, to the subset of subscribing wireless communications network users, the information from the information provider's first set of information that is desired to be received by the subscribing wireless communications network user.

15. A system for conducting targeted advertising using a wireless communications network, comprising:
   a. a central organizing entity to coordinate collection and transmission of advertising information, said central organizing entity also coordinating collection and distribution of fees for the targeted advertising service;
   b. a plurality of subscribing advertisers providing advertisements to the central organizing entity to be transmitted to targeted consumers using a wireless communications network, said subscribing advertisers paying a fee to the central organizing entity for the central organizing entity's service of transmitting the advertisements to the targeted consumers; and
   c. a plurality of subscribing consumers agreeing to receive, using a wireless communications network, a limited number of the advertisers' advertisements that are selected by said consumers, from the central organizing entity during a preselected time period in exchange for receiving a fee for each advertisement transmitted to the subscribing consumers over the wireless communications network.

16. The system for conducting targeted advertising using a wireless communications network, as provided in claim 15, wherein the limited number of advertisers' advertisements is approximately less than 25.

17. The system for conducting targeted advertising using a wireless communications network, as provided in claim 15, wherein the plurality of subscribing consumers agree to receive a first limited number of selected advertisers' advertisements from the central organizing entity, and a second limited number of advertisers' advertisements that are not selected by the subscribing consumers, from the central organizing entity in exchange for receiving a fee for each advertisement transmitted to each subscribing consumer using the wireless communications network.

18. The system for conducting targeted advertising using a wireless communications network, as provided in claim 17, wherein the first limited number of specifically selected advertisers' advertisements is approximately less than 20, and the second limited number of advertisers' advertisements not selected by the consumer is approximately less than 5.

19. The system for conducting targeted advertising using a wireless communications network, as provided in claim 17, wherein the first limited number of specifically selected advertisers' advertisements is approximately less than 40, and the second limited number of advertisers' advertisements not selected by the consumer is approximately less than 10.

20. The system for conducting targeted advertising using a wireless communications network, as provided in claim 15, wherein the wireless communications network is a cellular media network.

21. A system for directing information over a wireless communications network to various wireless communications devices used by a selected group of wireless communications device users, comprising:
   a. a central organizing entity to coordinate collection and transmission of information to be directed to a selected group of wireless communications device users, said central organizing entity also coordinating collection and distribution of fees for the service of directing the information;
   b. an information provider supplying the information to the central organizing entity to be transmitted to the selected group of wireless communications device users, using a wireless communications network, said information provider paying a fee to the central organizing entity for the central organizing entity's service of transmitting the information to the selected group of wireless communications device users; and
   c. a selected group of wireless communications device users subscribing with the central organizing entity to receive the information provided by the information provider and transmitted by the central organizing entity to the wireless communications devices of the selected group of wireless communications device users.

22. The system for directing information over a wireless communications network to a selected group of wireless communications device users, of claim 21, wherein the information provider is a governmental entity.

23. The system for directing information over a wireless communications network to a selected group of wireless communications device users, of claim 21, wherein the information provider is a medical provider.

24. The system for directing information over a wireless communications network to a selected group of wireless communications device users, of claim 21, wherein the information provider is a behavior modification organization.

25. The system for directing information over a wireless communications network to a selected group of wireless communications device users, of claim 21, wherein the wireless communications network is a cellular communications network and the wireless communications devices are mobile cellular devices.

26. A system for directing information over a wireless communications network to various wireless communications devices used by a selected group of wireless communications device users, comprising:
   a. a central organizing entity to coordinate collection and transmission of information to be directed to a selected group of wireless communications device users, said central organizing entity also coordinating collection and distribution of fees for the service of directing the information;
   b. an information provider supplying the information to the central organizing entity to be transmitted to the selected group of wireless communications device users, using a wireless communications network; and c. a selected group of wireless communications device users subscribing with the central organizing entity to receive the information provided by the information provider and transmitted by the central organizing entity to the wireless communications devices of the selected group of wireless communications device users, said selected group of wireless communications device users paying a fee to the central organizing entity for the central organizing entity's service of transmitting the information to the selected group of wireless communications device users.

27. A system for directing information over a wireless communications network to various wireless communications devices used by a selected group of wireless communications device users, comprising:

a. a central organizing entity to coordinate collection and transmission of information to be directed to a selected group of wireless communications device users, said central organizing entity also coordinating collection and distribution of fees for the service of directing the information;

b. an information provider supplying the information to the central organizing entity to be transmitted to the selected group of wireless communications device users, using a wireless communications network;

c. a selected group of wireless communications device users subscribing with the central organizing entity to receive the information provided by the information provider and transmitted by the central organizing entity to the wireless communications devices of the selected group of wireless communications device users; and d. at least one sponsoring entity to pay a fee to the central organizing entity for the central organizing entity's service of transmitting the information to the selected group of wireless communications device users.

* * * * *